May 29, 1956  W. A. SPECK  2,748,365
NEUTRAL BAR ASSEMBLY
Filed Aug. 30, 1952  3 Sheets-Sheet 1

WITNESSES:

INVENTOR
Willis A. Speck.
BY
ATTORNEY

May 29, 1956 W. A. SPECK 2,748,365
NEUTRAL BAR ASSEMBLY
Filed Aug. 30, 1952 3 Sheets-Sheet 2

WITNESSES:

INVENTOR
Willis A. Speck.
BY
ATTORNEY

May 29, 1956  W. A. SPECK  2,748,365
NEUTRAL BAR ASSEMBLY
Filed Aug. 30, 1952  3 Sheets-Sheet 3

WITNESSES:
Robert A Baird
Wn. C. Groome

INVENTOR
Willis A. Speck.
BY
ATTORNEY

United States Patent Office 2,748,365
Patented May 29, 1956

2,748,365

NEUTRAL BAR ASSEMBLY

Willis A. Speck, Union, N. J., assignor to Westinghouse Electric Corporation, East Pittsburgh, Pa., a corporation of Pennsylvania Application August 30, 1952, Serial No. 307,283

10 Claims. (Cl. 339—198)

My invention relates, generally, to a neutral bar assembly and, more particularly, to brackets for mounting neutral bars in panelboards and the like.

In the construction of panelboards, it is frequently necessary to provide more than one neutral bar in order to connect the neutral wires for the load circuits controlled by a panelboard. Since the amount of space in a panelboard is limited, the installing of an extra neutral bar in a panelboard is a problem which, heretofore, has not been solved in an entirely satisfactory manner.

An object of my invention is to provide a rigid and secure support for a plurality of neutral bars in a panelboard.

Another object of my invention is to provide a mounting bracket which will support either one or more than one neutral bar.

A further object of my invention is to provide a mounting bracket which prevents movement of the neutral bar in horizontal and vertical planes.

Still another object of my invention is to provide for offsetting the neutral bars both vertically and horizontally to facilitate making electrical connections to the bars.

A still further object of my invention is to provide for optional grounding of the neutral bars to the panelboard cabinet.

Other objects of my invention will be explained fully hereinafter or will be apparent to those skilled in the art.

In accordance with one embodiment of my invention, a generally L-shaped bracket member has one leg secured to an insulating base and the other leg has integrally formed portions bent at angles to provide supports for one neutral bar. A second L-shaped member has one leg secured to one leg of the first member and the other leg disposed to support another neutral bar. The neutral bars are offset vertically and horizontally to facilitate the connecting of the load circuit neutral wires to the bars. The bars are attached to the bracket by screws which extend through the tang of the main terminal lug, the neutral bars, and the bracket members, thereby electrically connecting the neutral bars to the terminal lug. In another modification of the invention, a stepped member is attached to an L-shaped bracket and a neutral bar is mounted on each step of the stepped member.

For a better understanding of the nature and objects of my invention, reference may be had to the following detailed description, taken in conjunction with the accompanying drawings; in which.

Figure 1:
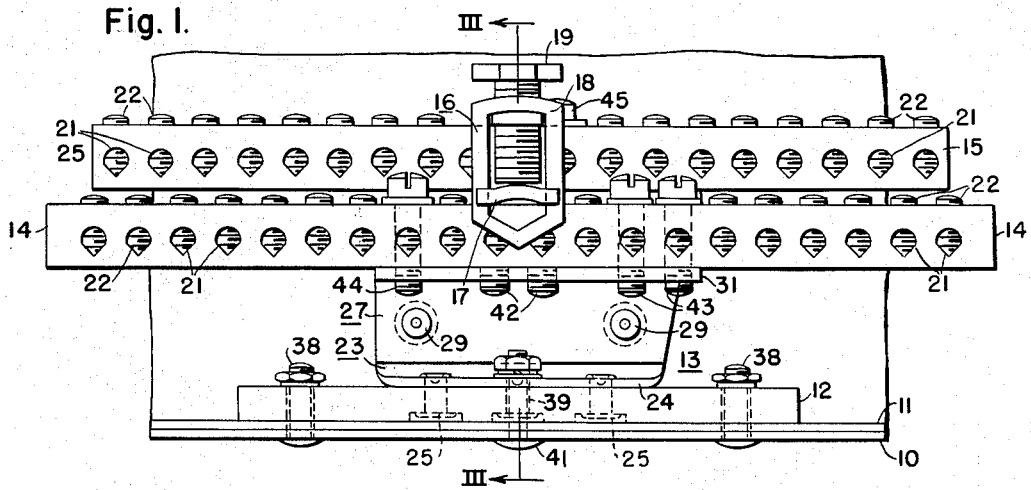
Figure 1 is a view, in front elevation, of a neutral bar assembly embodying the principal features of my invention.
Figure 2:
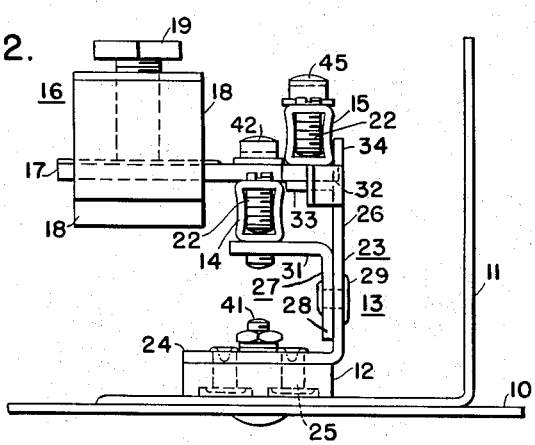
Fig. 2 is a view, in end elevation, of the structure shown in Fig. 1.
Figure 3:
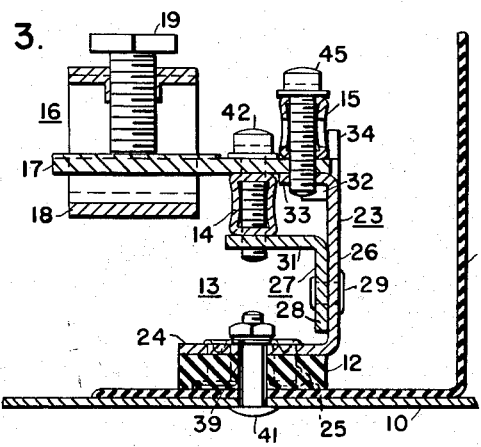
Fig. 3 is a view, in section, taken along the line III—III in Fig. 1.

Referring to the drawings, and particularly to Figs. 1, 2 and 3, the structure shown therein comprises a portion of a mounting plate or pan 10, a barrier 11 of insulating material, an insulating base 12, a mounting bracket 13, one or more neutral bars 14 and 15 which are supported by the bracket 13, and a terminal lug 16 having a tang 17, a sleeve 18 and a screw 19 which engages the tang 17 to retain the sleeve 18 on the tang and to hold a cable between the tang and the sleeve in a manner well known in the art. The plate 10 may be adjustably mounted in a panelboard cabinet (not shown) in a manner well known in the art.

As shown, the neutral bars 14 and 15 are tubular members which are substantially rectangular in cross-section. Each neutral bar is provided with a plurality of oppositely disposed openings 21 in the sides of the bar. The openings 21 have V-shaped bottoms and a screw 22 is threaded through the top of the bar in alignment with each pair of openings 21 for pressing a neutral wire into the V-shaped portion of the opening 21, thereby retaining the wire in the opening. As shown, the neutral bars 14 are offset both horizontally and vertically to facilitate installation of the neutral wires for the load circuits controlled by the panelboard. The main neutral wire or cable may be connected to the neutral bars by means of the terminal lug 16.

As explained hereinbefore, considerable difficulty has been experienced mounting the neutral bars in a panelboard cabinet in a manner which is both electrically and mechanically secure. In order to overcome this difficulty I have provided the mounting bracket 13.

Figure 4:
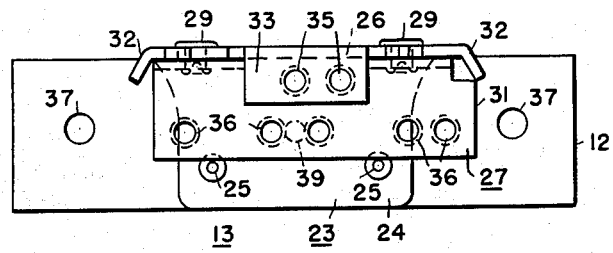
Fig. 4 is a view, in plan, of the mounting bracket for the neutral bars.
Figure 5:
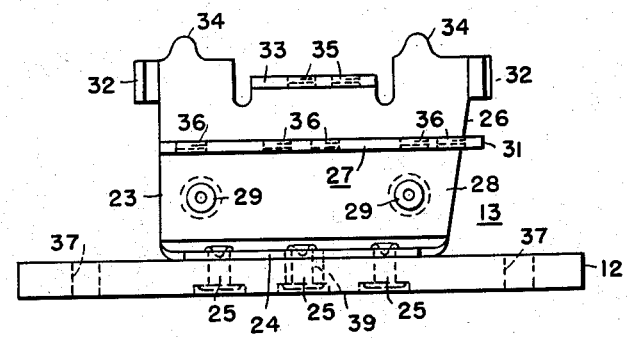
Fig. 5 is a view, in front elevation, of the mounting bracket.
Figure 6:
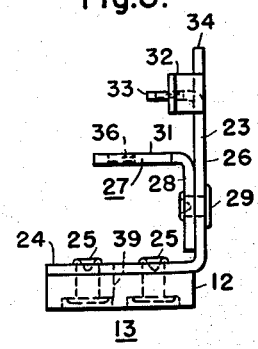
Fig. 6 is a view, in end elevation, of the mounting bracket.

As shown in Figs. 4, 5, and 6, the mounting bracket 13 comprises an L-shaped member 23 having one leg 24 secured to the insulating base 12 by rivets 25 and the other leg 26 disposed perpendicularly to the base 12. A second L-shaped member 27 has one leg 28 secured to the leg 26 of the member 23 by rivets 29 and another leg 31 spaced from and disposed parallel to the leg 24 of the first L-shaped member.

The leg 26 of the member 23 has an integrally formed angularly bent ear 32 at each upper corner. The ears 32 are disposed above and extend parallel to the leg 31 of the L-shaped member 27. The leg 26 of the L-shaped member 23 also has an integrally formed tongue 33 which is bent at right angles to the leg 26 and extends parallel to the leg 31. The tongue 33 is substantially midway between the ears 32 and the top of the tongue is below the tops of the ears 32 by a distance equal to the thickness of the tang 17 of the terminal lug 16. The leg 26 also has two spaced projections 34 which extend upwardly above the tops of the ears 32.

The tongue 33 has two tapped holes 35 therein. The leg 31 of the L-shaped member 27 has five tapped holes 36 therein. The base 12 has two holes 37 therein for receiving bolts 38 (Fig. 1) for attaching the base to the mounting plate 10. The leg 24, the base 12, the barrier 11 and the plate 10 have aligned holes 39 therein for receiving a grounding bolt 41 which may be utilized to ground the neutral bars to the panelboard cabinet if desired.

As shown most clearly in Figs. 1, 2 and 3, the neutral bar 14 is attached to the leg 31 of the L-shaped member 27 by two screws 42 which extend through the tang 17, the neutral bar 14 and are threaded into two of the holes 36 in the leg 31. The bar 14 is also attached to the leg 31 by two screws 43 which extend through the neutral bar and are threaded into holes 36 in the leg 31. As shown in Fig. 1, another screw 44 may also extend through the neutral bar 14 and is threaded into a hole 36 in the leg 31.

If desired, the two screws 43 may be utilized for attaching an additional terminal lug, similar to the lug 16, to the neutral bar 14. Also, if desired, the screw 44 may be utilized for making a ground connection to the neutral bars. In this manner the neutral bar 14 is rigidly attached to the leg 31 of the L-shaped member 27 which, in turn, is secured to the leg 26 of the L-shaped member 23, as explained hereinbefore.

The neutral bar 15 is attached to the tongue 33 of the L-shaped member 23 by two screws 45 which extend through the neutral bar 15 and the tang 17, which is disposed between the bar 15 and the tongue 33, and are threaded into the holes 35 in the tongue 33. Thus, the neutral bar 15 is electrically connected to the tang 17 and mechanically attached to the tongue 33.

As shown most clearly in Fig. 2, the neutral bar 15 rests upon the ears 32 of the leg 26 of the L-shaped member 23. Thus, the ears 32 help support the neutral bar 15. As also shown in Figs. 2 and 3, one side of the neutral bar 15 engages the projections 34 of the L-shaped member 23. Thus, the projections 34 prevent turning of the neutral bar about the screws 45 which was one of the principal difficulties encountered with supporting means previously utilized.

In this manner the bar 15 is securely connected to the tang 17 and it is rigidly supported by the L-shaped member 23. Since the bar 14 is also securely connected to the tank 17 and rigidly supported by the L-shaped member 27, both neutral bars are electrically and mechanically secure. Furthermore, the bars are so mounted that the load circuit neutral wires may be readily connected to the bars.

Figure 7:
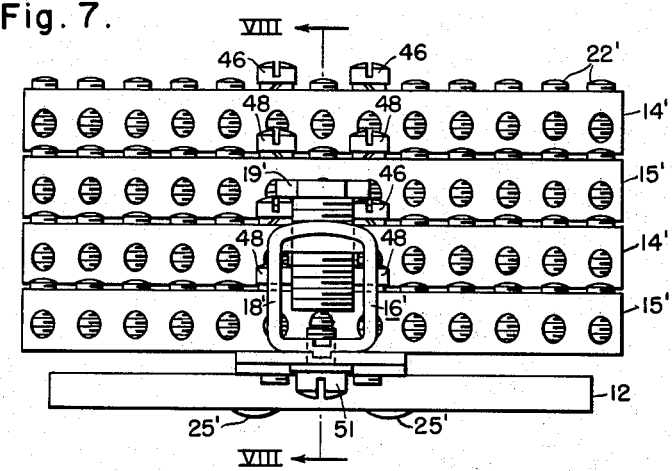
Fig. 7 is a view, in front elevation, of a modification of the invention.
Figure 8:
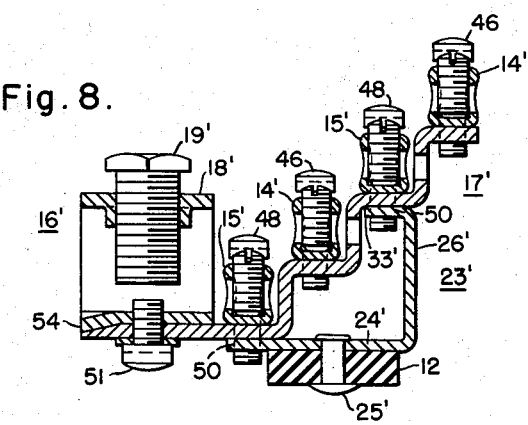
Fig. 8 is a view, in section, taken along the line VIII—VIII in Fig. 7.
Figure 9:
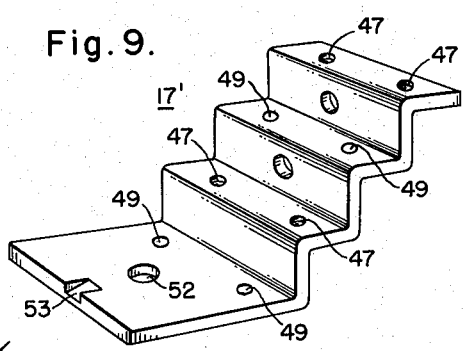
Fig. 9 is a view, in perspective, of the stepped member provided for supporting the neutral bars.

In the modification of the invention shown in Figs. 7, 8 and 9, in which like parts are designated by the same reference characters as in Figs. 1 to 6, a generally L-shaped bracket member 23', which may be of steel, has one leg 24' secured to the insulating base 12 by rivets 25'. The other leg 26' has a portion 33' which extends parallel to and is spaced from the leg 24'. The base 12 may be attached to the mounting pan of a panelboard in the manner previously described.

A stepped conducting member 17' is supported by the bracket 23'. The member 17' is preferably formed from sheet copper or similar material having a relatively high electrical conductivity. As shown most clearly in Fig. 8, neutral bars 14' may be mounted on certain of the steps of the member 17' and neutral bars 15' may be mounted on other steps of the member 17'. Each neutral bar 14' is attached to the member 17' by screws 46 which extend through the neutral bars 14' and are threaded into tapped holes 47 in the member 17'. Each neutral bar 15' is attached to the member 17' by screws 48 which extend through the neutral bar 15', holes 49 in the member 17' and are threaded into holes 50 in the bracket 23'.

Thus, the neutral bars are electrically connected to the conducting member 17' and they are mechanically supported by this member which, in turn, is supported by the bracket 23'. As shown in Fig. 9, the member 17' is of sufficient width and the holes 47 and 49 are spaced sufficiently far apart to provide a rigid and secure support for the neutral bars.

A terminal lug 16' is provided for connecting a main neutral wire or cable to the member 17'. The lug 16' has a sleeve 18' which is attached to the member 17' by means of a screw 51 which is disposed in a hole 52 in the member 17' and is threaded into the bottom of the sleeve 18'. A notch 53 is provided in the one corner of the member 17' for receiving a projection 54 on the bottom of the sleeve 18' to prevent the sleeve from turning about the screw 51. A screw 19' is provided in the sleeve 18' for securing the neutral wire in the sleeve.

As shown in Fig. 7, the present structure is of a relatively narrow width and is particularly suitable for utilization in column-type panelboards of a relatively narrow width where the length of the neutral bars is limited. The required number of neutral connections is obtained by pyramiding a plurality of bars in the manner shown. If desired, additional steps may be provided on the member 17' to accommodate additional neutral bars.

From the foregoing description, it is apparent that I have provided neutral bar assemblies which may be readily installed in a panelboard cabinet and which provide a mechanically rigid and electrically secure mounting for one or more neutral bars. The mounting bracket may be readily constructed since the L-shaped members may be formed from sheet steel by well-known punching and bending operations.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a neutral bar assembly, in combination, a base, a generally L-shaped member having one leg secured to the base, a second L-shaped member having one leg secured to one leg of the first member and the other leg disposed parallel to and spaced from the base, an integrally formed tongue on the first member extending parallel to and spaced from the base, and a neutral bar attached to the part of one of said members which is disposed parallel to the base, said other parallel extending part being available for the addition of a second neutral bar.

2. In a neutral bar assembly, in combination, a base, a generally L-shaped member having one leg secured to the base, a second L-shaped member having one leg secured to one leg of the first member and the other leg disposed parallel to and spaced from the base, a first neutral bar attached to one leg of the second L-shaped member, integrally formed angularly bent ears on the first member, an integrally formed tongue on the first member extending parallel to and spaced from the one leg on the second member which supports the first neutral bar, a second neutral bar attached to said tongue and resting upon said ears, and upwardly extending projections on the first member engaging the second neutral bar.

3. In a neutral bar assembly, in combination, a base, a generally L-shaped member having one leg secured to the base, a second L-shaped member having one leg secured to one leg of the first member and the other leg disposed parallel to and spaced from the base, a first neutral bar attached to one leg of the second L-shaped member, integrally formed angularly bent ears on the first member, an integrally formed tongue on the first member extending parallel to and spaced from the one leg on the second member which supports the first neutral bar, a second neutral bar attached to said tongue and resting upon said ears, and spaced upwardly extending projections on the first member engaging the second neutral bar at opposite sides of its attachment to said tongue.

4. In a neutral bar assembly, in combination, a base, a generally L-shaped member having one leg secured to the base, a second L-shaped member having one leg secured to one leg of the first member and the other leg disposed parallel to and spaced from the base, a first neutral bar attached to one leg of the second L-shaped member, integrally formed angularly bent ears on the first member, an integrally formed tongue on the first member extending parallel to and spaced from the one leg on the second member which supports the first neutral bar, a second neutral bar attached to said tongue and resting upon said ears, and a terminal lug having a tang attached to both of said neutral bars.

5. In a neutral bar assembly, in combination, a base, a generally L-shaped member having one leg secured to the base, a second L-shaped member having one leg secured to one leg of the first member and the other leg disposed parallel to and spaced from the base, a first neutral bar attached to one leg of the second L-shaped member, integrally formed angularly bent ears on the first member, an integrally formed tongue on the first member extending parallel to and spaced from the one leg on the second member which supports the first neutral bar, a second neutral bar attached to said tongue and resting upon said ears, a terminal lug having a tang attached to both of said neutral bars, screws extending through said tang and the first neutral bar into said second L-shaped member, and additional screws extending through said second neutral bar and the tang into said tongue on the first L-shaped member.

6. In a neutral bar assembly, in combination, a base, a generally L-shaped member having one leg secured to the base, a second L-shaped member having one leg secured to one leg of the first member and the other leg disposed parallel to and spaced from the base, a first neutral bar attached to one leg of the second L-shaped member, integrally formed angularly bent ears on the first member, an integrally formed tongue on the first member extending parallel to and spaced from the one leg on the second member which supports the first neutral bar, a second neutral bar attached to said tongue and resting upon said ears, a terminal lug having a tang attached to both of said neutral bars, and upwardly extending projections on the first member engaging the second neutral bar.

7. In a neutral bar assembly, in combination, a base, a generally L-shaped member having one leg secured to the base, a second L-shaped member having one leg secured to one leg of the first member and the other leg disposed parallel to and spaced from the base, a first neutral bar attached to one leg of the second L-shaped member, integrally formed angularly bent ears on the first member, an integrally formed tongue on the first member extending parallel to and spaced from the one leg on the second member which supports the first neutral bar, a second neutral bar attached to said tongue and resting upon said ears, a terminal lug having a tang attached to both of said neutral bars, screws extending through said tang and the first neutral bar into said second L-shaped member, additional screws extending through said second neutral bar and the tang into said tongue on the first L-shaped member, and spaced integrally formed upwardly extending projections on the first member engaging the second neutral bar at opposite sides of its attachment to said tongue.

8. In a panelboard, in combination, a mounting plate, a base attached to the plate, a generally L-shaped member having a first leg secured to the base and a second leg disposed perpendicularly to the base, a second L-shaped member having a first leg secured to the second leg of the first member and a second leg disposed parallel to and spaced from the first leg of the first member, a first neutral bar attached to the second leg of the second L-shaped member, spaced integrally formed angularly bent ears on the second leg of the first L-shaped member, an integrally formed tongue on the second leg of the first member extending parallel to and spaced from the second leg of the second member, a second neutral bar attached to said tongue and resting upon said ears, and projections extending above said ears on the first member and engaging the second neutral bar.

9. In a panelboard, in combination, a mounting plate, an insulating base attached to the plate, a generally L-shaped member having a first leg secured to the base and a second leg disposed perpendicularly to the base, a second L-shaped member having a first leg secured to the second leg of the first member and a second leg disposed parallel to and spaced from the first leg of the first member, a first neutral bar attached to the second leg of the second L-shaped member, spaced integrally formed angularly bent ears on the second leg of the first L-shaped member, an integrally formed tongue on the second leg of the first member extending parallel to and spaced from the second leg of the second member, a second neutral bar attached to said tongue and resting upon said ears, projections extending above said ears on the first member and engaging the second neutral bar, and a terminal lug having a tang attached to both of said neutral bars.

10. In a panelboard, in combination, a mounting plate, an insulating base attached to the plate, a generally L-shaped member having a first leg secured to the base and a second leg disposed perpendicularly to the base, a second L-shaped member having a first leg secured to the second leg of the first member and a second leg disposed parallel to and spaced from the first leg of the first member, a first neutral bar attached to the second leg of the second L-shaped member, spaced integrally formed angularly bent ears on the second leg of the first L-shaped member, an integrally formed tongue on the second leg of the first member extending parallel to and spaced from the second leg of the second member, a second neutral bar attached to said tongue and resting upon said ears, projections extending above said ears on the first member and engaging the second neutral bar, a terminal lug having a tang engaging both of said neutral bars, a screw extending through said tang and the first neutral bar into said second L-shaped member, an additional screw extending through said second neutral bar and the tang into said tongue on the first L-shaped member, and grounding means connecting the first L-shaped member to said mounting plate.

References Cited in the file of this patent

UNITED STATES PATENTS

| Number | Name | Date |
|---|---|---|
| 2,006,622 | Allen | July 2, 1935 |
| 2,411,014 | Warnke | Nov. 12, 1946 |
| 2,450,050 | Macy | Sept. 28, 1948 |
| 2,511,995 | Robertson et al. | June 20, 1950 |
| 2,559,715 | Earle et al. | July 10, 1951 |